United States Patent

Picha

[11] 4,112,654
[45] Sep. 12, 1978

[54] ROTARY KNIFE ADJUSTER ASSEMBLY

[75] Inventor: Donald A. Picha, Plainfield, Ill.

[73] Assignee: International Harvester Company, Chicago, Ill.

[21] Appl. No.: 753,751

[22] Filed: Dec. 23, 1976

[51] Int. Cl.² .................... A01D 45/02; A01D 55/32
[52] U.S. Cl. ........................ 56/98; 56/14.5; 56/119
[58] Field of Search ............... 56/98, 119, 14.5, 14.3, 56/53; 74/242.1 A, 242.1 TA, 242.15 R

[56] References Cited

U.S. PATENT DOCUMENTS

| | | | |
|---|---|---|---|
| 2,210,341 | 8/1940 | Rund, Jr. | 56/119 |
| 2,708,821 | 5/1955 | Heth | 56/119 |
| 3,096,604 | 7/1963 | Baker et al. | 56/119 |
| 3,392,514 | 7/1968 | McEachern et al. | 56/98 |
| 3,492,797 | 2/1970 | Sears | 56/119 |
| 3,736,733 | 6/1973 | Fell et al. | 56/98 |
| 3,909,987 | 10/1975 | MacCarthy, Sr. | 74/242.15 R |
| 3,940,913 | 3/1976 | Wallenfang et al. | 56/98 |

OTHER PUBLICATIONS

Hesston Pull Type Forage Harvesters, Models 2000-150, Operator's Manual and Parts Listing attached, Aug. 26, 1975.

*Primary Examiner*—Russell R. Kinsey
*Assistant Examiner*—Paul J. Hirsch
*Attorney, Agent, or Firm*—Dennis K. Sullivan; F. David AuBuchon

[57] ABSTRACT

Adjusting apparatus is provided for a rotary crop cutting knife on a row crop harvesting machine. The apparatus mounting the knife on the crop divider provides a tilting adjustment of the cutting plane about an axis transverse of the crop passage, a linear vertical adjustment of the cutting plane, and a tilting adjustment of the cutting plane about an axis longitudinal of the divider, the apparatus preferably being a rectangular bar, to which the knife is rotatably mounted in depending relationship, which has a portion telescoped within the divider frame and clamped there inside by an arrangement of bolts providing these adjustments.

11 Claims, 5 Drawing Figures

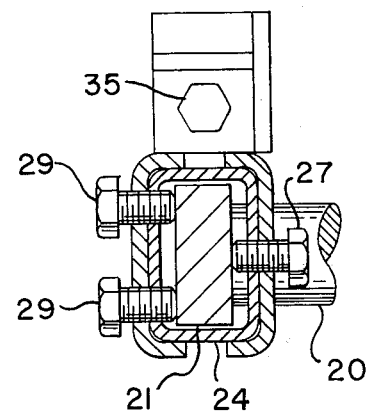
FIG_5_
FIG_2_
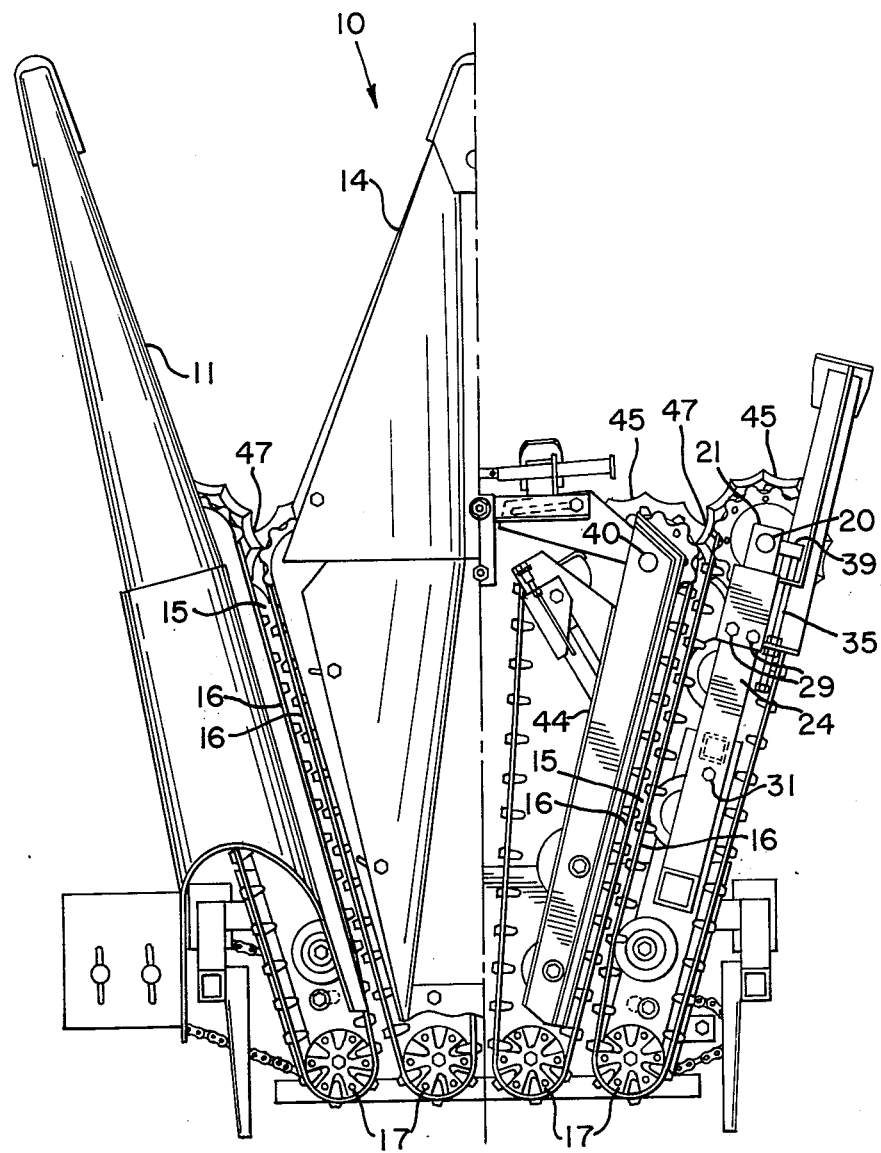

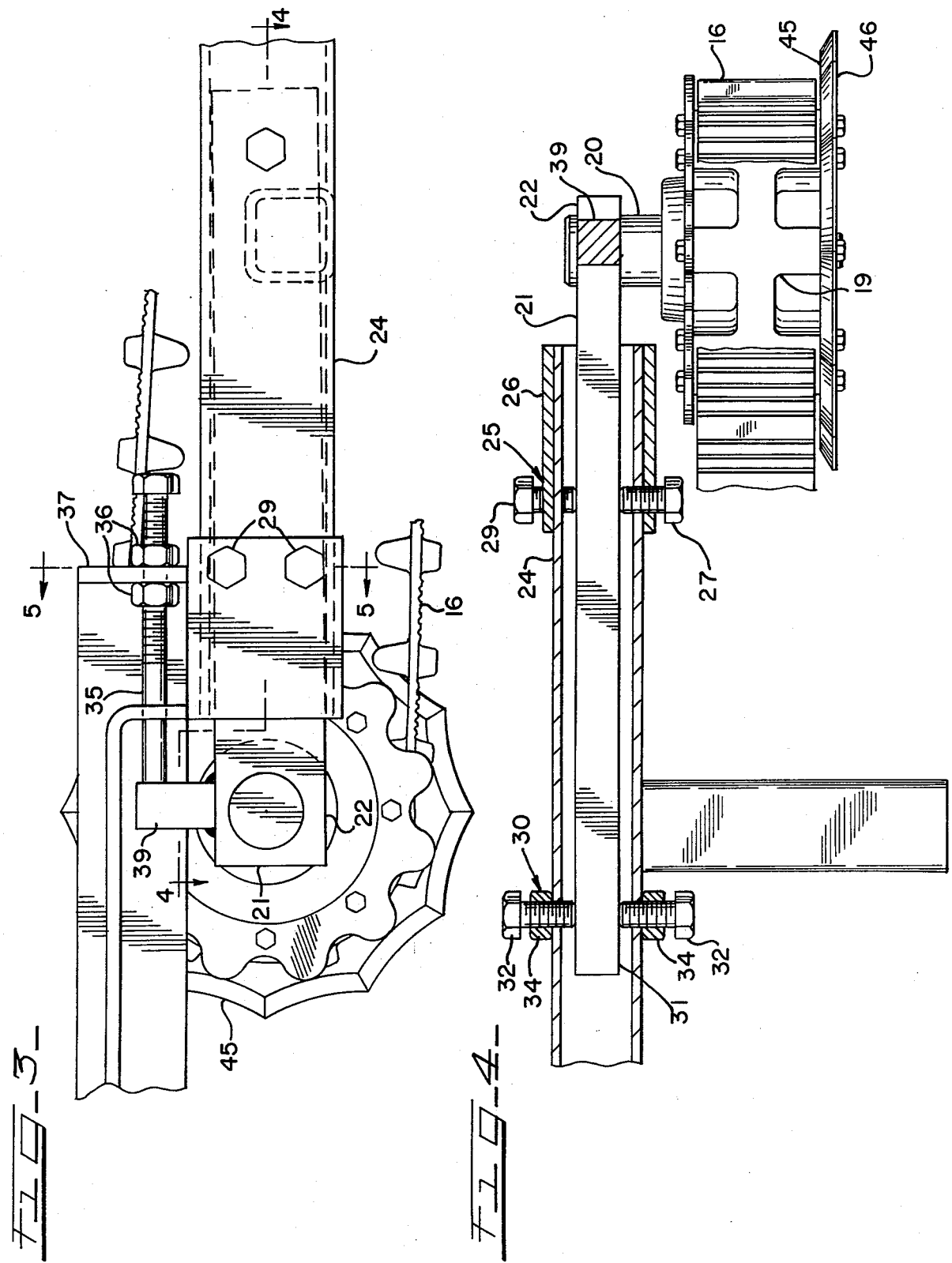

ROTARY KNIFE ADJUSTER ASSEMBLY

CROSS REFERENCE TO RELATED APPLICATIONS

This application is related to application Ser. No. 690,813, filed May 27, 1976, and now abandoned and assigned to the assignee hereof.

BACKGROUND OF THE INVENTION AND THE PRIOR ART

This invention is related to a row crop harvester having a rotary knife cutting mechanism and, more particularly, to a means for mounting a rotary knife thereon providing adjustments for properly positioning a knife against its cooperative cutting edge.

To obtain optimum cutting efficiency, it is desirable that the rotary cutting knife turn in a plane parallel to and closely spaced with its cooperative cutting edge, which might be a stationary blade or, as here, a second rotary knife. Since the cutting blades wear in use and since, in the manufacture of the row crop harvesting unit, it is not realistic to expect a fixed rotational mounting of the rotary blades to consistently achieve the desired parallalism, it becomes necessary to provide a means for adjusting the relative position of the blades. Others have taught a vertical adjustment of the rotary knife and a linear adjustment longitudinally of the divider frame, the latter being primarily to tension the knife drive means. See, for example, U.S. Pat. No. 3,940,913. Still others have provided a pair of rotating disk cutters wherein both cutters may be linearly adjusted vertically or longitudinally of the divider and, additionally, the cutting plane of one knife may be tilted about an axis longitudinal of the divider. This latter adjusting system still does not allow full adjustment since the cutting planes could be skewed about an axis transverse of the divider.

SUMMARY OF THE INVENTION

Accordingly, it is the object of the invention described and claimed herein to provide an adjustable mounting apparatus for a rotary crop cutting knife on a row crop harvester wherein the cutting plane of the knife can be tilted about an axis transverse of the divider frame.

It is further an object of the invention to provide said adjusting apparatus wherein the cutting plane can also be tilted about an axis longitudinal of the divider.

A further object of the invention is to provide said adjusting apparatus wherein the cutting plane further can be adjusted vertically.

A still further object of the invention is to also provide a linear adjustment of the rotary axis of the cutting knife longitudinally of the divider, primarily to tension the knife drive means.

A more specific object of the invention is to provide a second rotary knife as a cooperative cutting means for said rotary knife wherein the cutting plane of the second rotary knife is fixed so that the optimization of the relative position of the two rotary knives is accomplished by adjusting only one knife.

The above objects are preferably specifically met in a row crop harvesting machine including a pair of dividers defining a crop passageway opening forwardly of said machine and a pair of rotary crop cutting knives respectively mounted to each of the divider frames near the forward end of the passageway and driven by gathering means running along the passage. One of the rotary knives is rotatably mounted in fixed position on the inner drive frame and the other rotary knife is rotatably mounted on a rectangular bar having a portion extending longitudinally within the outer divider frame. Forward and rear clamping means, in the form of bolts threaded in the divider frame and extending from the bar respectively to the top and bottom sides thereof, provide independent vertical adjustments of the forward and rearward portions of the bar within the divider frame, thereby providing for tilting adjustment of the cutting plane about a transverse axis and vertical adjustment of the cutting plane. The forward bolts are arranged with two upper bolts laterally offset to either side of a single lower bolt, thus providing a tilting adjustment of the cutting plane about a longitudinal axis. An external screw contacts a portion of the bar to move the axis of the rotary knife longitudinally against the tension of the drive means for the rotary knife.

DESCRIPTION OF THE DRAWINGS

Other objects and advantages of the invention will become apparent upon reading the following detailed description and upon reference to the drawings, in which:

FIG. 2 is a top view, partially in section, of the row crop unit of FIG. 1, the sheet metal on the right side of the machine being removed to illustrate the knife adjusting mechanism;

FIG. 3 is an enlarged top view of a portion of FIG. 2 illustrating the mounting of the outer right rotary knife to the outer divider frame;

FIG. 4 is a side sectional view of the rotary knife mounting of FIG. 3 taken along the line 4—4 thereof; and FIG. 5 is a sectional view of the divider frame taken along the line 5—5 of FIG. 3.

DETAILED DESCRIPTION OF THE PREFERRED EMBODIMENT

Figure 1:
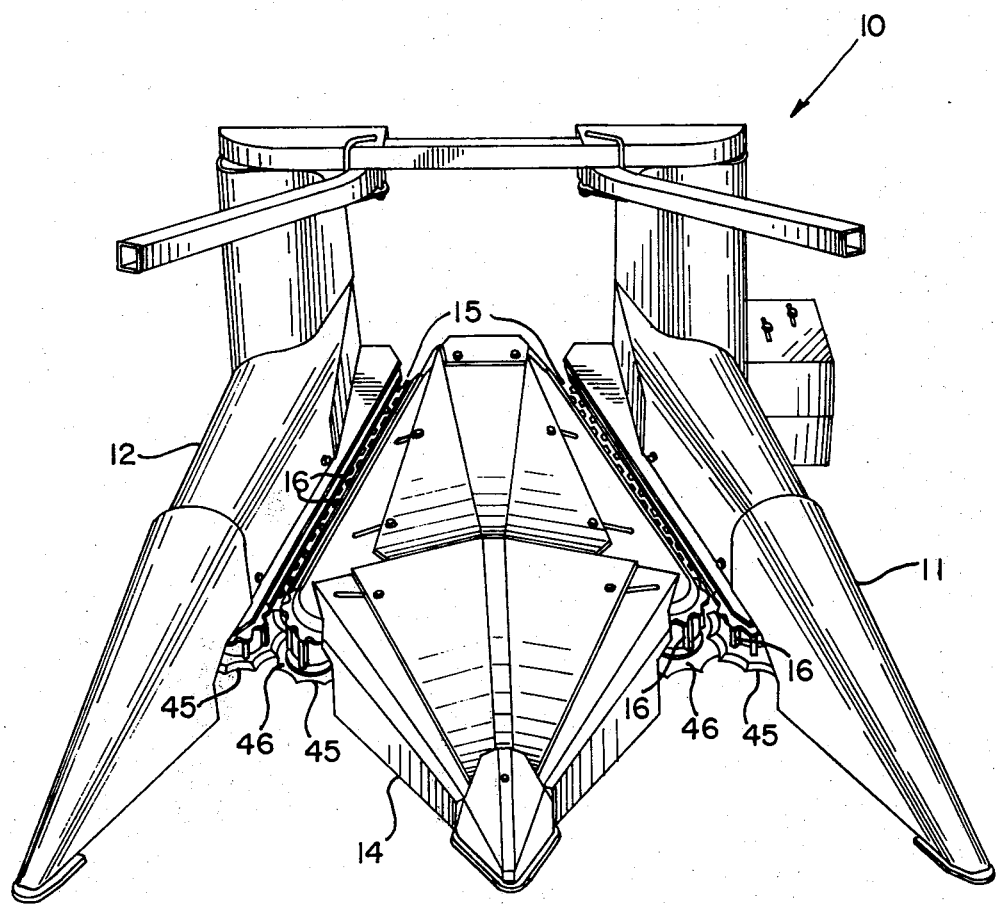
FIG. 1 is a frontal perspective view of a row crop harvesting unit incorporating the claimed invention.

Turning to FIGS. 1 and 2, there is shown a row crop harvesting and gathering unit generally designated 10. The row crop unit is specifically described in the referenced copending application, Ser. No. 690,813, now abandoned which is specifically incorporated by reference herein. For purposes of the present invention, the row crop unit 10 includes left and right (as viewed from the rear) outer dividers 11 and 12 and a center divider 14. Each outer divider defines, with the center divider, a crop passageway 15 which opens forwardly of the row unit 10 to receive crops and converges rearwardly to the center of the unit. Gathering means, in the form of ribbed endless belts 16 run rearwardly along the sides of the passageways 15 to deliver the crops through the rear end of the row crop unit 10 to an associated forage harvester (not shown) on which the row crop unit is mounted for operation and which furnishes its driving power. As may be seen in FIG. 2, each gathering belt is entrained about a driving sprocket 17 at the rear end of the passageway 15, the forward end of the belt being entrained on a forward idler sprocket 19 shown partially in FIG. 4.

The forward idler sprockets 19 are rotatably mounted, as by bearings, respectively on a shaft 20 on the outer side of the passageway 15 and on a shaft 40 on the inner side of the passageway. The outer shaft 20 is fixedly mounted to and depends downwardly from an elongated bar 21 of rectangular cross-section near its outer end 22. The rectangular bar 21 extends longitudinally within an outer divider frame member 24 running adjacent the outer side of the passageway 15, the frame member 24 being tubular having a rectangular cross section of a vertical dimension sufficiently greater, for example, 0.6 inch, than that of the bar 24 to accommodate fore-and-aft tilting and vertical adjustments of the bar thereinside and of a lateral diminsion slightly greater, for example, 0.12 inch, than the bar to accommodate tilting of the bar about a longitudinal axis.

As best seen in FIGS. 3, 4, and 5, means are provided for adjustably fixing the rectangular bar 21 in selected positions within the divider frame member 24, comprising a forward vertical clamping means 25 near the forward end 26 of the divider frame member 24, which take the form of a lower bolt 27 threaded in the bottom side of the divider frame 24 near the lateral center thereof and extending upwardly to the bar 21 and a pair of upper bolts 29 threaded in the top side of the divider frame 24 and laterally offset respectively on either side from the lower bolt 27 and extending downwardly to the bar 21. The means for adjustably fixing the position of the bar 21 with the frame 24 further comprises a rearward clamping means 30 located near the rear end 31 of the bar 21 in the form of a pair of vertically aligned bolts 32 at the lateral center of the divider frame member and threaded therein as by weld nuts 34 thereon, one bolt 32 extending from the top side thereof and one from the bottom side thereof. As may be seen, the bar 21 may be tilted in the fore-and-aft plane, that is, about an axis transverse of the passageway 15 or vertically raised and lowered by manipulating the bolts 27, 29 to raise or lower the forward end of the bar 21 and the bolts 32 to raise and lower the rear end 31 thereof within the divider frame 24. As may be seen from FIG. 5, the bar 21 may also be tilted about an axis longitudinal of the divider frame 24 by respectively raising and lowering each of the upper bolts 29 which causes the bar 21 to pivot about the lower bolt 27.

The bar 21 may be slid longitudinally of the divider frame by releasing the clamping pressure of the bolts 27, 29, 32. Since an outward adjustment of the bar acts against the tension of the belt 16, a longitudinal screw 35 (FIG. 3) is mounted as by jammed nuts 36 to the external portion of the divider frame 24 as at 37 and extends forwardly (through the reinforcing gusset) to contact a projection 39 welded to the bar 21 adjacent the shaft 20.

The inner shaft 40 is mounted parallel to the outer shaft 20 in fixed position depending from the inner frame member 44 running adjacent the inner side of the passageway 15. Mounted as by bolts on the lower side of the forward belt idlers 19, which are rotatably mounted on the shafts 20, 40 as mentioned above, are rotary cutting knives 45 having cutting planes 46 substantially perpendicular to the shafts 20, 40. The mounting of the cutting knife 45 to the idler 19 on the outer shaft 20, as shown in FIG. 4, is the same as the mounting of the knife on the idler 19 on the inner shaft 40, except that the cutting knife on the inner shaft 40 is upside down so that the cutting planes 46 are face to face and partially overlap to cooperatively cut the crop stalks at their nip 47 (FIG. 2). The cutting knives 45 thus rotate about the shafts 20, 40, being driven by the gathering belts 16 through the idlers 19.

In adjusting the cutting planes 46 of the inner and outer knives 45 to produce closely spaced parallelism therebetween, or slight contact at the nip 47 if desired although not recommended, the inner knife remains in a fixed position on its fixed shaft 40. The bolts 27, 29, 32 are loosened slightly and the axis of the outer rotary knife, that is, the shaft 20, is moved forwardly by the external screw 35 to adjust the belt tension. Since the shaft 20 is welded to the rectangular bar 21 and the cutting plane 46 is parallel to the bar, the adjustments of the bar 21 referred to above will tilt or vertically adjust the cutting plane 46 in the same manner. Thus, by alternatively loosening and tightening respectively the upper and lower bolts, of either clamping means 25 or 30, either the forward or the rearward end of the bar may be raised or lowered independently of the other end to tilt the bar 21 and the cutting plane 46 about an axis transverse of the passageway 15. To achieve a vertical raising and lowering of the cutting plane, the forward and rearward ends of the bar can both be raised or lowered in equal amounts. Tilting of the bar and the cutting plane about a longitudinal axis can be accommodated by backing out one of the bolts 29 and turning in the other. Since the rearward bolts 32 are vertically aligned, they will not interfere significantly with this longitudinal axis tilting, although some small deformation of the bar 21 may occur because the ends of the bolts 32 are not pointed. When all adjustments are made, all bolts are then highly torqued to achieve a large clamping force, alleviating the need for lock washers.

It is noted that no provision is made herein for adjustments of the cutting knives 46 towards and away from each other along a line transverse of the passageway 15. While this adjustment could be provided, for example, by increasing the lateral clearance between the divider frame 24 and rectangular bar 21 and adding clamping means similar to those shown but acting along a transverse line, such adjustment is not considered necessary in view of the overlapping nature of the rotary cutting knives used here.

Thus, it is apparent that there has been provided, in accordance with the invention, an improved rotary knife adjusting means for use in a row crop harvester that fully satisfies the objects, aims, and advantages set forth above. While the invention has been described in conjunction with specific embodiments thereof, it is evident that many alternatives, modifications, and variations will be apparent to those skilled in the art in the light of the foregoing description. Accordingly, it is intended to embrace all such alternatives, modifications, and variations as fall within the spirit and broad scope of the appended claims.

What is claimed is:

1. In a row crop harvesting machine of the type including a pair of crop dividers defining a crop passageway having an opening forwardly of said machine, a rotary crop cutting knife mounted to the frame of one of said dividers adjacent the forward end of said passageway, said knife having a rotational axis and a cutting plane perpendicular thereto, drive means for said rotary knife, and cooperative cutting means associated with said knife such that the crop stalks are cut therebetween, the improvement wherein said knife is mounted to said divider frame by mounting means providing a tilting adjustment of said cutting plane relative to said cooperative means about an axis generally transverse of the said divider, said mounting means comprising a bar having a portion extending longitudinally within said divider frame, said rotary knife being rotatably mounted to and dependent from the portion of said bar extending externally of said divider frame and a plurality of vertically adjustable clamping means for clamping the bar within the divider frame, said clamping means providing independent vertical adjustments of the rearward portion of said bar and of the forward portion of said bar within said divider frame.

2. The invention in accordance with claim 1 and one of said clamping means having relatively vertically adjustable elements laterally of said bar to provide tilting of said bar about an axis longitudinal of said divider.

3. The invention in accordance with claim 2 and said bar being rectangular in section.

4. The invention in accordance with claim 3 and said one of said clamping means comprising a first bolt threadingly engaged with and extending vertically from one side of the divider frame to said bar and a pair of bolts threadingly engaged with and extending from the other side of the divider frame to said bar, said pair of bolts being laterally offset from said first bolt, one to each side.

5. The invention in accordance with claim 4 and the other of said clamping means comprising a pair of substantially vertically aligned bolts threadingly engaged with and extending respectively from the opposite sides of said frame to said bar.

6. The invention in accordance with claim 5 and said cooperative cutting means comprising a second rotary knife having a fixed cutting plane on the opposite side of said passageway.

7. The invention in accordance with claim 6 and longitudinal screw means mounted on said divider frame for engaging and moving said bar longitudinally of said divider frame.

8. A row crop harvesting and gathering machine comprising a pair of crop dividers defining a forwardly opening crop passageway, one of said dividers having a main frame and a longitudinal extension portion telescoped within said main frame, a shaft affixed to and depending downwardly from said extension portion adjacent the forward end of said passageway, a forward idler sprocket rotatably mounted on said shaft, a first rotary crop cutting knife fixed to said sprocket, a crop gathering means disposed along said crop passageway and entrained on said idler sprocket for driving said first rotary knife, and a cooperative cutting means disposed in said passageway operatively adjacent said first rotary knife for cutting crops therebetween, said divider frame extension portion being mounted to said divider main frame by adjustable means providing a tilting adjustment of said first rotary cutting knife relative to said cooperative cutting means about an axis transverse of said divider between various fixed positions.

9. The invention in accordance with claim 8 and said cooperative cutting means comprising a second rotary cutting knife rotatably mounted on a second shaft on the other side of said passageway from said first rotary knife.

10. The invention in accordance with claim 8 and the same adjustable means for mounting said extension portion in said main frame portion further providing a tilting adjustment of said first cutting knife about an axis longitudinal of said divider.

11. The invention in accordance with claim 10 and the same adjustable means for mounting said extension portion in said main frame additionally providing a linear vertical adjustment of said first cutting knife relative to said second rotary cutting knife.

* * * * *